Figure 5:
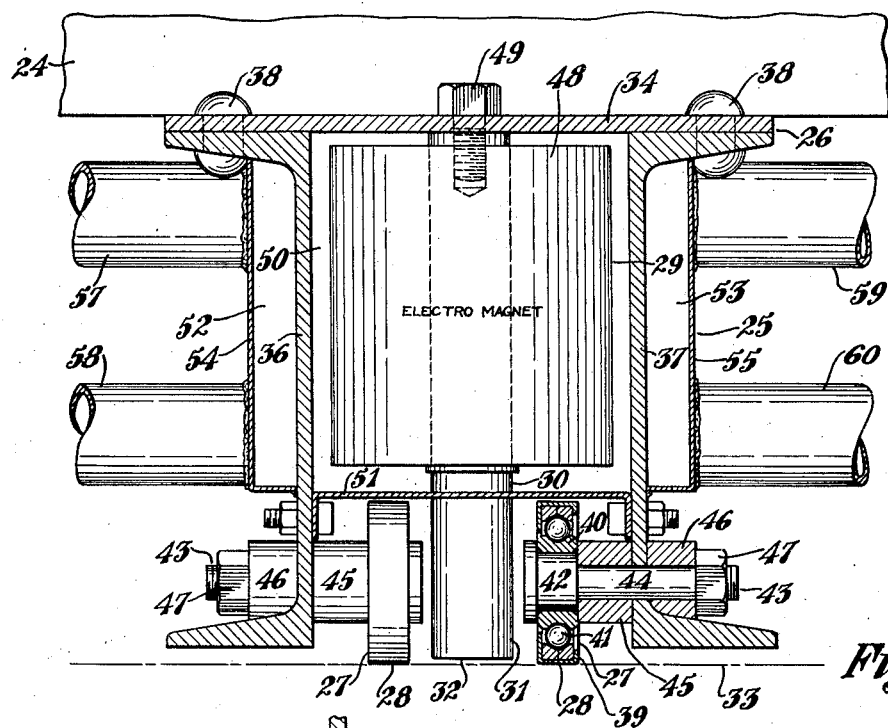

March 12, 1940. R. E. CARTER 2,193,162
APPARATUS FOR HANDLING MAGNETIC SHEETS AND THE LIKE
Filed Sept. 19, 1938 3 Sheets-Sheet 1
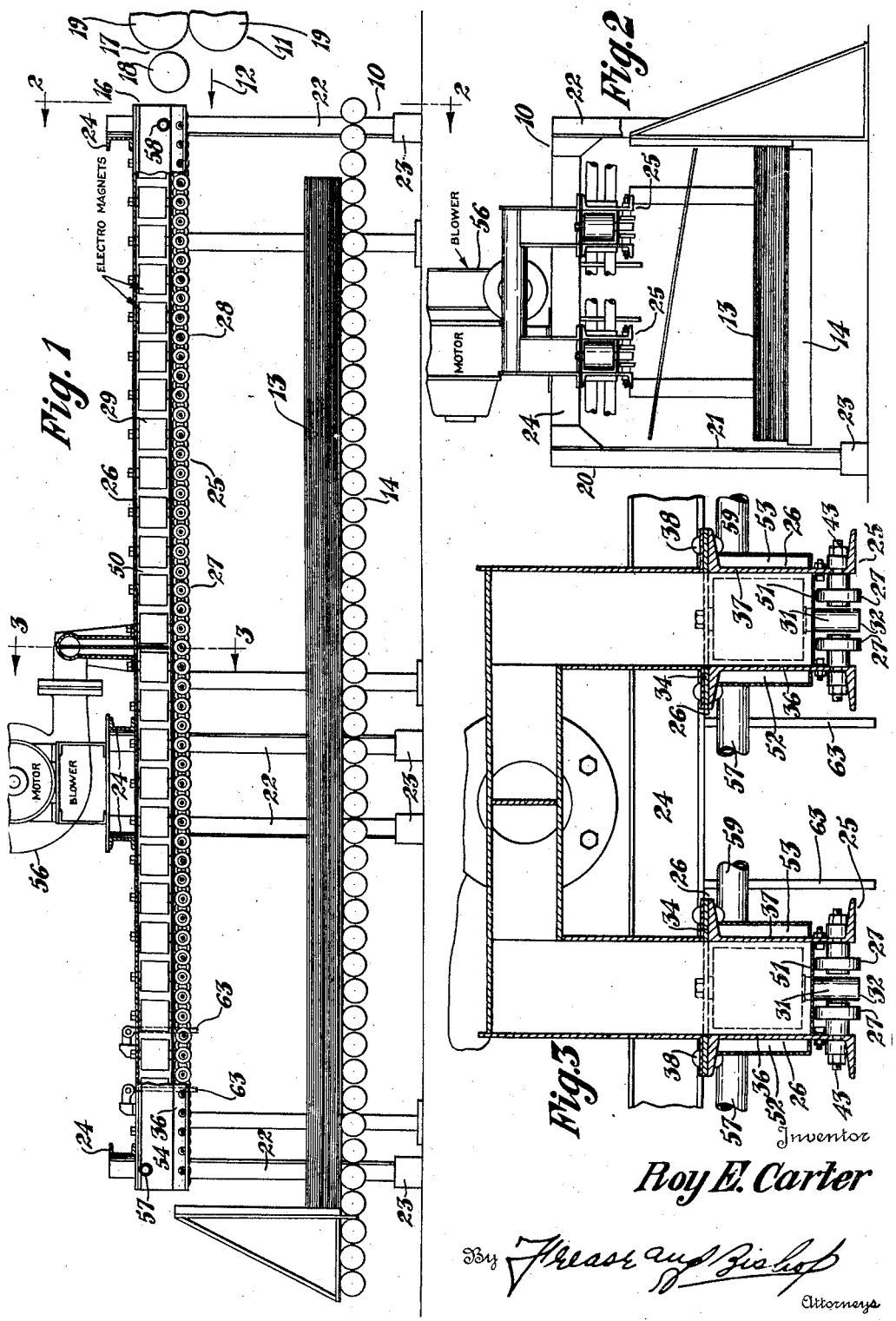
Inventor
Roy E. Carter
By Frease and Bishop
Attorneys Inventor
Roy E. Carter March 12, 1940.  R. E. CARTER  2,193,162
APPARATUS FOR HANDLING MAGNETIC SHEETS AND THE LIKE
Filed Sept. 19, 1938  3 Sheets-Sheet 3
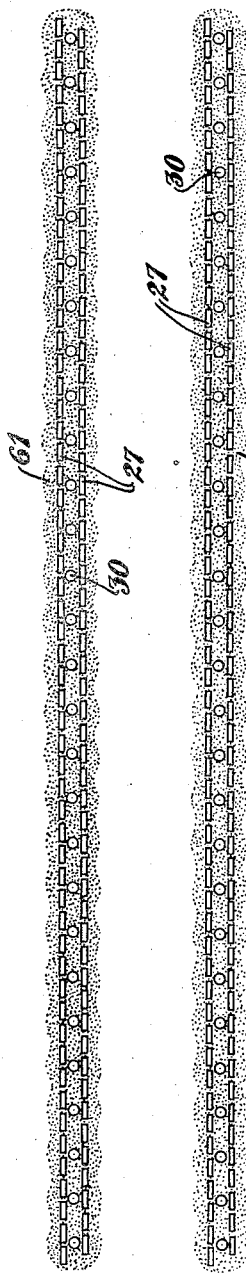
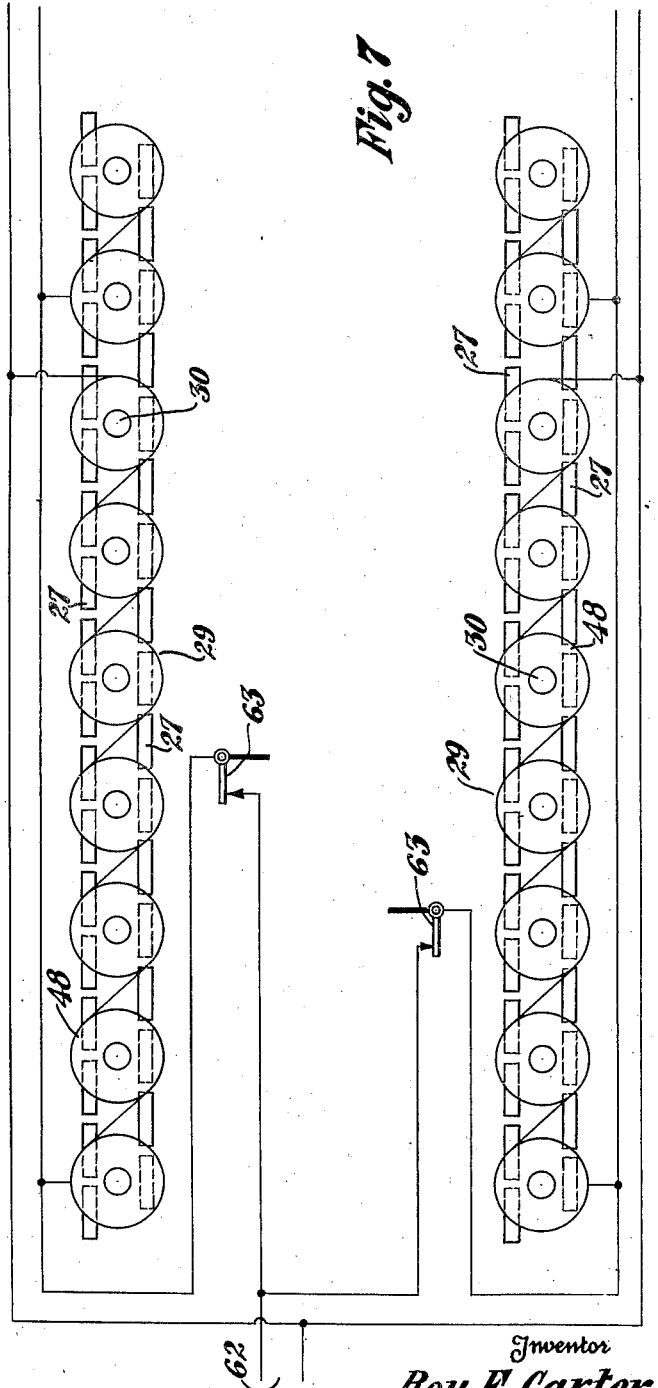
Inventor
Roy E. Carter
By Pease and Bishop
Attorneys Patented Mar. 12, 1940

2,193,162

UNITED STATES PATENT OFFICE 2,193,162

APPARATUS FOR HANDLING MAGNETIC SHEETS AND THE LIKE

Roy E. Carter, Niles, Ohio

Application September 19, 1938, Serial No. 230,599

4 Claims. (Cl. 198—41)

My invention relates to methods and apparatus for handling magnetic sheets and the like, and more particularly for handling iron or steel sheets in a sheet manufacturing plant, either in conveying the steel sheets from one processing machine or apparatus to another, or for conveying the sheets from the discharge end of a processing machine or apparatus and dropping the successive sheets to form a pile, such conveying and piling being carried out without the use of mechanical supporting means beneath the sheets by subjecting the sheets to the action of mechanical and magnetic forces, the magnetic forces when applied comprising a magnetic field tending to move the sheets upwardly against upper abutments or stops, which may be the bottoms of conveyor rollers and the like.

Methods and apparatus have been proposed prior to the present improvements for handling magnetic sheets and the like by utilizing the action of upwardly directed magnetic forces in conjunction with some form of conveyor having downwardly directed members such as rollers or belts to oppose the tendency of the magnetic field to move the sheets upwardly, and thus to maintain the sheet against the rollers or belts.

In some cases the magnetic field has been provided by magnetizing the conveyor rollers themselves, and in other cases by the use of electromagnets spaced a relatively great distance apart.

On the one hand, the magnetized rollers have had their axes of rotation extending cross-wise of the direction of movement of the conveyed sheet, and accordingly the sheet has been subject to the action of the forces of longitudinally spaced laterally extending band magnetic fields; and on the other hand, when the electro-magnets are used which are spaced apart a relatively great distance, the sheet being conveyed is subject to widely separated or spaced concentrated magnetic fields.

The stop or reacting means opposing the action of the magnetic forces in usual methods and apparatus for handling magnetic sheets, similarly usually apply widely spaced concentrated reacting forces upon the sheet being conveyed.

Such methods and apparatus are consequently suitable and satisfactory only for the heavier gauges of individual sheets and plates, since the lighter gauges of sheets are undesirably flexed or rippled in passing over widely spaced concentrated mechanical stops or abutments and through widely spaced concentrated magnetic fields, because a lighter gauge sheet will sag between such widely spaced stops and abutments and concentrated magnetic fields.

Moreover, the advancing end of a light gauge sheet on such usual handling apparatus likewise has a tendency to sag and fall away from the conveying rolls or belt.

Even in handling the heavier gauges of sheets and plates, such usual combined electro-magnetic and mechanical handling apparatus is not well adapted for handling relatively long sheets, since in a relatively long sheet, the failure of one or more widely spaced concentrated magnetic fields may result in a slipping away or dropping of the sheet at an undesired location.

From another standpoint in a sheet mill, apparatus for handling the sheets discharged by a hot mill must be adapted to withstand the temperature of such hot sheets; and the methods and apparatus heretofore used for handling sheets by utilizing mechanical and magnetic forces, have not been particularly adapted for use in handling the hot sheets discharged by a hot mill.

The objects of the present improvements include the provision of improved methods, method steps, and apparatus for handling magnetic sheets and the like by the combined application of mechanical and magnetic forces, in such manner as to prevent sagging, and being adapted to handle relatively light gauge sheets.

Further objects of the present improvements include the provision of improved methods, method steps, and apparatus for handling magnetic sheets and the like by the application of combined mechanical and magnetic forces, and adapted for handling sheets, plates, or strips, of substantially any desired length.

Further objects of the present improvements include the provision of improved apparatus for handling magnetic sheets and the like, the apparatus being of simplified construction adapted for economical manufacture, and for easy and economical maintenance.

Further objects of the present improvements include the provision of improved apparatus for handling magnetic sheets and the like, which is particularly adapted for handling hot sheets, such as those discharged from a hot mill.

Further objects of the present improvements include the provision of improved general and detail constructions and arrangements of certain parts of the apparatus.

The foregoing and other objects are attained by the methods, method steps, apparatus, parts, combinations, and subcombinations of the present invention, the nature of which is set forth in the following general statement, and preferred embodiments of which are set forth in the following description, and which are particularly and distinctly pointed out and set forth in the appended claims forming part hereof, or in claims which may originate herein.

The nature of the improved methods and method steps of the present invention may be stated in general terms as including in the handling of magnetic sheets and the like by the combined action of mechanical and magnetic forces, the method steps including moving the magnetic sheet and the like in one direction preferably in a conveying direction, preferably lengthwise of the sheet, and subjecting the sheet preferably to laterally spaced elongated and relatively narrow magnetic fields, each elongated magnetic field extending in the general direction of movement of the conveyed sheet, and being substantially longitudinally continuous throughout the entire longitudinal travel of the conveyed sheet, the lines of force of each of the elongated magnetic fields being angular to the surfaces of the conveyed sheet, and simultaneously opposing the tendency of the elongated magnetic fields to move the conveyed sheet by mechanical stop or abutment forces located relatively close together and closely adjacent the elongated magnetic fields substantially throughout the entire length thereof, the combined action of the magnetic and mechanical forces being such as to provide laterally spaced substantially longitudinally continuous supporting forces preferably adjacent the longitudinal sides of the conveyed sheet.

The nature of the improved apparatus of the present invention may be stated in general terms as including means for moving a magnetic sheet and the like in a conveying surface or plane, means for subjecting the conveyed sheet preferably to the action of a plurality of laterally spaced elongated magnetic fields extending preferably throughout the entire length of the sheet and the movement thereof in the direction of conveyance, and means for opposing the tendency of the magnetic fields to move the conveyed sheet including preferably roller abutments located relatively close together and closely adjacent the elongated magnetic fields throughout the entire length of the sheet and its travel in the improved conveying apparatus.

Each of the laterally spaced elongated magnetic fields is preferably associated with its roller abutments so that the roller abutments are located on opposite sides of the longitudinal center plane of the magnetic field so that a conveyed sheet is supported laterally as well as longitudinaly in a flat plane.

Improved means are furthermore preferably provided for cooling the electro-magnetic means, the rollers, and other parts of the apparatus.

The apparatus furthermore includes improved general and detail arrangements of certain parts as hereinafter set forth and claimed.

Figure 4:
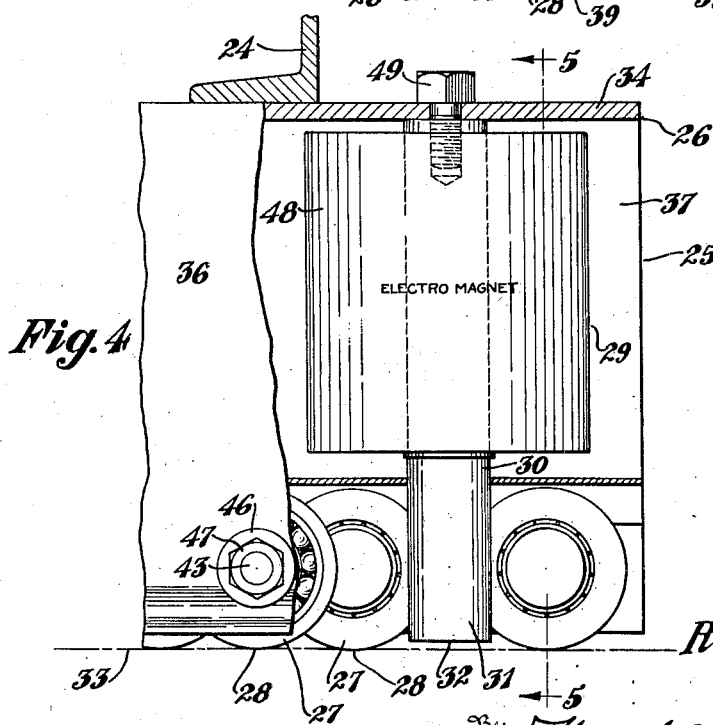

By way of example, embodiments of the improved apparatus hereof and certain of the parts thereof, adapted for carrying out the improved method and/or method steps hereof are illustrated in the accompanying drawings forming part hereof, in which Figure 1 is a partially schematic and partially diagrammatic side elevation view with portions in section of one embodiment of the improved apparatus hereof, particularly adapted for handling sheets discharged from a hot mill;

Fig. 2, a fragmentary end view thereof looking in the direction of the arrows 2—2, Fig. 1;

Fig. 3, an enlarged fragmentary transverse sectional view thereof as on line 3—3, Fig. 1;

Fig. 4, an enlarged fragmentary view with portions in section of the upper right hand corner of Fig. 1;

Fig. 5, a fragmentary transverse sectional view thereof as on line 5—5, Fig. 4;

Fig. 6, a diagrammatic plan view of the apparatus illustrating the elongated magnetic fields and adjacent reacting rollers closely spaced throughout the entire lengths of the magnetic fields; and Fig. 7, a fragmentary wiring diagram of the improved apparatus.

Similar numerals refer to similar parts throughout the drawings.

The embodiment of the improved apparatus hereof illustrated in the drawings is indicated generally by 10, and is particularly adapted for handling steel sheets which are discharged by the hot mill indicated generally by 11, so as to convey horizontally each sheet discharged in the direction of the arrow 12 from the hot mill 11, and to drop each sheet at a point in its horizontal travel so as to form a pile of sheets 13 which may be and preferably is located upon a roller conveyor 14.

The sheet receiving end 16 of the improved handling apparatus 10 is located adjacent to and in alinement with the discharge end 17 of the hot mill 11, and a magnetic driven roll 18 may be interposed between the pinch rolls 19 at the discharge end 17 of the hot mill 11 and the receiving end 16 of the improved handling apparatus 10.

The improved handling apparatus 10 associated as above set forth by way of example with the hot mill 11 and the roller conveyor 14, includes a plurality of supporting U frames 20 straddling the roller conveyor 14, and each including laterally spaced legs 21 and 22 and having their lower ends supported on suitable foundation blocks 23 and having their upper ends mounting a supporting beam 24 spaced above the roller conveyor 14.

The supporting beams 24 of the several U frames 20 carry beneath their lower faces two laterally spaced longitudinally extending improved electro-magnetic conveyor units 25.

Each improved electro-magnetic conveyor unit 25 includes a longitudinally extending frame indicated generally by 26, two laterally spaced rows of rollers 27 mounted on the frame, the axes of rotation of the rollers being longitudinally spaced from each other on the frame, and the peripheries of the rollers, preferably the bottoms 28, defining a conveying surface, preferably a downwardly facing conveying surface spaced above the roller conveyor 14.

Means are provided for creating a magnetic field of force whose magnetic attraction for sheets and the like is towards the peripheries of the rollers, that is, as shown upwards towards the bottoms 28 of the rollers 27, and the magnetic field creating means as shown and preferably includes a plurality of electro-magnets each indicated generally by 29, and each preferably including a magnetic core 30 having a pole 31 located between the two laterally spaced rows of rollers 27, and the pole 31 terminating in the end face 32 above the conveying surface defined by the bottoms 28 of the rollers 27, which conveying surface or plane is indicated in Figs. 5 and 6 by the dot-dash line 33.

In each improved conveyor unit 25, the longitudinally extending frame 26 preferably includes an upper longitudinally extending plate 34 from which depend lateraly spaced longitudinally extending side members 36 and 37, which as shown may be in the form of similar channels, each having opposite and outwardly directed upper and lower flanges, the upper flanges being secured to the plate 34 as by rivets 38.

The rollers 27 of one row are mounted on the web of the channel side member 36 adjacent the lower flange thereof; and the rollers 27 of the other row are mounted upon the web of the channel side member 37 adjacent the lower flange thereof.

Each of the rollers 27, as best shown in Fig. 5, may be an anti-friction ball bearing including an outer annular member 39 with an inner raceway therein, and an inner annular member 40 with an outer raceway therein, and balls 41 interposed between the inner and outer annular members and rolling in the raceways thereof. The inner annular member 40 may be as shown in Fig. 5 mounted upon a shoulder 42 of a bolt 43, the shank 44 of which extends through an aperture provided in the web of the side member of the frame 26 mounting the same, and spacing collars 45 and 46 may be located on opposite sides of the web of the side member, and a nut 47 is screwed upon a threaded outer end of each bolt 43 clamping and securing the roller 27 mounted thereon to the frame side member.

Each of the electro-magnets 29 includes in addition to the core 30, a winding or coil 48 located upon the upper portion of the core 30, the upper end of the core 30 being secured to the plate 34 as by a bolt 49.

For providing for cooling the coils of the electro-magnets 29, which are located between the frame side members 36 and 37 and adjacent the frame plate 34, a conduit 50 is formed by the frame members or walls 34, 36, and 37, and by a longitudinally extending wall 51 which is located between the lower ends of the magnet coils 48 and the tops of the rollers 27, the lower ends of the magnet cores 30 extending below the wall 51 through apertures formed therein.

The conduit 50 is an air cooling conduit, and the frame 26 is furthermore preferably provided with longitudinally extending liquid or water cooling conduits 52 and 53 formed by the webs of the side channel members 36 and 37, respectively, the upper flanges thereof, and by longitudinally extending L walls 54 and 55, respectively.

Motor driven blower means indicated generally by 56 are associated with the air cooling conduits 50 for blowing air therethrough for cooling the magnet coils 48, as best shown in Figs. 1, 2, and 3; and the liquid or water cooling conduits 52 and 53 are provided respectively with pipes 57 and 58, and 59 and 60, by means of which a flow of cooling water may be provided through the conduits 52 and 53, serving to cool the rollers 27 so that the improved apparatus 10 may be used when desired for handling the sheets discharged by the hot mill 11.

The electro-magnets 29 are relatively close together and longitudinally spaced throughout the entire length of the frame 26; and when energized the electro-magnets of each conveyor unit 25 creates an elongated relatively narrow magnetic field 61 substantially the entire length of the conveyor unit, as best shown diagrammatically in Fig. 6; and the lines of force of the elongated magnetic fields 61 are angular to the conveying surface 33, and any sheet being conveyed therein.

The rollers 27 in each conveyor unit 25 at opposite sides of the cores 30 of the electro-magnets 29 thereof, provide mechanical reacting means closely spaced together adjacent the elongated magnetic field 61 and extending substantially the entire length of each conveyor unit 25.

The vertical longitudinal axes of the cores 30 of the electro-magnets 29 in each unit 25 determine the longitudinal center plane of the magnetic field 61 created by the electro-magnets, and the location of a row of rollers 27 as shown having their opposite end faces equally spaced from opposite sides of the axes of the cores 30 provides for holding a sheet being conveyed by the apparatus laterally as well as longitudinally flat.

Particularly when handling a light gauge sheet, if the sheet is not supported flat at or adjacent each of its opposite sides by the laterally spaced elongated magnetic fields 61 and the opposing roller abutments, there is a tendency for the sheet to laterally bend upwards or downwards.

If only a set of the rollers 27 is utilized on the outside of each row of cores 30 in each conveyor unit 25, the tendency of a light gauge sheet being conveyed is to bend upwardly towards the bottom faces 32 of the cores 30, which may result in a sticking of the sheet against the bottom faces 32 of the cores 30.

A reverse but otherwise similar bending action occurs with light gauge sheets if only a row of rollers 27 is provided spaced from the insides of the cores 30 in each conveyor unit 25.

When the electro-magnets 29 of the conveyor units are energized, the combined effect of the elongated magnetic field 61 and the rollers 27 is to maintain a sheet moving endwise beneath the rollers in rolling contact with the bottoms 28 of the rollers 27, throughout the entire length of the sheet and throughout its entire travel over the rollers.

The movement of the sheet endwise of itself may be effected by the velocity imparted thereto in being discharged from a rolling mill, such as the hot mill 11; or driving means, such as the magnetic drive roll 18 may be utilized.

In any event, each sheet conveyed beneath the rollers 27 is supported in the conveying surface 33 adjacent its opposite sides throughout its entire length, so that no lengthwise sagging is possible, and accordingly the sheet may be of relatively light gauge, or may be of substantially any length.

When the improved apparatus 10 is arranged for piling as shown in the drawings, the magnets of each conveyor unit 25 are connected with each other and with a power line 62, and with a trip switch 63 interposed between the magnet windings and the power line so that the trip switch 63 may be abutted by the advancing end of a sheet being conveyed to break the circuit and deenergize the magnets permitting the sheet to drop from beneath the rollers 27.

It is desirable to provide for the dropping of one side of the sheet ahead of the other side as shown in Fig. 2, and for effecting this the trip switch 63 of one of the conveyor units 25 is located closer to the receiving end 16 of the apparatus 10 than the other, or one trip switch may be used in combination with a vari-time electric control.

The wiring diagram for the electro-magnets 29 and switches 63 is shown in Fig. 7.

The embodiments of the present improvements illustrated and described herein are by way of example, and the scope of the present invention is not limited to the same or to the particular details thereof, but is commensurate with any and all novel subject matter contained herein which may at any time properly under the patent laws be set forth in the claims hereof or originating herein, and the elements of any such claims are intended to include their functional or structural equivalents.

I claim:

1. In magnetic sheet handling apparatus and the like, supporting members, and a pair of longitudinally extending electro-magnetic conveyor units carried by the supporting members, each conveyor unit including a plurality of rollers and a plurality of electro-magnets and the axes of rotation of the rollers being longitudinally spaced from each other and the bottoms of the rollers defining a downwardly facing conveying surface and the electro-magnets when energized creating a magnetic field of force whose direction of attraction for magnetic sheets and the like is towards the bottoms of the rollers, and each conveyor unit including a separate means for controlling the energization and de-energization of the electro-magnets thereof, and each controlling means including an actuating member arranged to be impinged by the end of a sheet and the like advancing on the bottoms of the rollers, the actuating members of the two controlling means being longitudinally spaced from each other in the direction of movement of the sheets and the like conveyed on the bottoms of the rollers.

2. In magnetic sheet handling apparatus and the like, a longitudinally extending frame, means on the frame for creating a magnetic field, and the frame including walls forming a liquid cooling conduit, and rollers on a liquid cooled wall of the frame and adjacent the magnetic field creating means.

3. In magnetic sheet handling apparatus and the like, a longitudinally extending frame, a plurality of longitudinally spaced electro-magnets on the frame, each electro-magnet including a core secured to the frame and a coil wound around a portion of the core, and the frame including walls forming an air cooling conduit within which the coils are located, and other walls forming a liquid cooling conduit adjacent the air cooling conduit, the cores extending externally of the air cooling conduit, and rollers on a liquid cooled wall of the frame and adjacent the externally extending cores.

4. In magnetic sheet handling apparatus and the like, a longitudinally extending frame, a plurality of longitudinally spaced electro-magnets on the frame, each electro-magnet including a core secured to the frame and a coil wound around a portion of the core, and the frame including walls forming a cooling conduit adjacent the coils, and rollers on a cooled wall of the frame and adjacent the externally extending cores.

ROY E. CARTER.